United States Patent [19]

Kunikane et al.

[11] Patent Number: 5,048,912

[45] Date of Patent: Sep. 17, 1991

[54] OPTICAL FIBER SWITCHING WITH SPHERICAL LENS AND METHOD OF MAKING SAME

[75] Inventor: I Tatsuro Kunikane, Yokohama; Kiyoshi Terai, Taito; Hidek; Isono, Yokohama, all of Japan; Michihiro Takamatsu, Tokorozawa, Japan

[73] Assignee: Fujitsu Limited, Kawasaki, Japan

[21] Appl. No.: 439,025

[22] PCT Filed: Mar. 9, 1989

[86] PCT No.: PCT/JP89/00253
§ 371 Date: Nov. 9, 1989
§ 102(e) Date: Nov. 9, 1989

[87] PCT Pub. No.: WO89/08858
PCT Pub. Date: Sep. 21, 1989

[30] Foreign Application Priority Data

Mar. 9, 1988 [JP] Japan ................................ 63-55326
Apr. 15, 1988 [JP] Japan ................................ 63-93829
Jul. 27, 1988 [JP] Japan ................................ 63-185536

[51] Int. Cl.$^5$ .......................... G02B 6/32; C03C 27/02
[52] U.S. Cl. ........................................ 385/23; 65/4.2; 65/59.4; 385/35
[58] Field of Search ............... 350/96.10, 96.15, 96.17, 350/96.18, 96.20, 96.21, 320, 252, 253; 65/59.4, 4.2, 37

[56] References Cited

U.S. PATENT DOCUMENTS

| | | | |
|---|---|---|---|
| 4,237,474 | 12/1980 | Ladany | 350/96.20 |
| 4,239,331 | 12/1980 | Aoyama | 350/96.20 |
| 4,307,935 | 12/1981 | Monnier | 350/96.20 |
| 4,702,547 | 10/1987 | Enochs | 350/96.20 |
| 4,875,750 | 10/1989 | Spaeth et al. | 350/96.18 |
| 4,966,439 | 10/1990 | Althaus et al. | 350/253 |
| 4,988,375 | 1/1991 | Bornhauser | 65/59.4 |
| 4,989,940 | 2/1991 | Wollenweber | 350/96.18 |
| 4,997,252 | 3/1991 | Sugawara et al. | 350/96.20 |

FOREIGN PATENT DOCUMENTS

| | | | |
|---|---|---|---|
| 56-117715 | of 0000 | Japan | 350/96.21 X |
| 54-66150 | 5/1979 | Japan | 350/96.18 X |
| 62-201706 | 12/1987 | Japan | 350/96.17 X |
| 62-293210 | 12/1987 | Japan | 350/96.18 X |

*Primary Examiner*—Brian Healy
*Attorney, Agent, or Firm*—Staas & Halsey

[57] ABSTRACT

A ferrule having an optical fiber connected thereto and a spherical lens are fixed in a cylindrical lens holder to form a fiber collimator. The thickness of a cylindrical wall of the lens holder is made smaller at a spherical lens receiving portion than the other portion and the cylindrical lens holder is fixed to a substrate by welding. A pair of such fiber collimators are provided in an opposing relationship to each other on the substrate, and an optical function element is disposed between the opposing fiber collimators to form an optical device. By provision of a light path changing over mechanism as such optical function element, an optical switch of a small size having a high performance can be provided.

9 Claims, 4 Drawing Sheets

OPTICAL FIBER SWITCHING WITH SPHERICAL LENS AND METHOD OF MAKING SAME

BACKGROUND OF THE INVENTION

1. Field of the Invention

This invention relates to an optical device which employs an optical part wherein a spherical lens is force fitted in a cylindrical lens holder, and more particularly to an optical switch which includes an optical part of the type mentioned.

2. Description of the Related Art

In the field of optical communications or optical transmissions, a spherical lens is widely applied in order to convert light emitted from a light emitting device or an emergent end of an optical fiber into a parallel beam of light or reversely to focus a parallel beam of light to a light detecting device or an incident end of an optical fiber. In such applications of a spherical lens, a structure is demanded which can fixedly hold a spherical lens firmly therein because the relative positional relationship between a spherical lens and either a light emitting device, a light detecting device, an optical fiber has a direct influence on the optical coupling efficiency of an optical device.

Conventionally, in fixing a spherical lens which has a spherical outer profile and is not necessarily easy to handle, the spherical lens is, for example, force fitted into a cylindrical lens holder so as to hold the spherical lens in the lens holder, and the spherical lens is fixed together with the cylindrical lens holder to a substrate by laser welding or the like. To better hold the spherical lens in the lens holder, the diameter of the spherical lens is set a little greater than the diameter of a receiving hole formed in the lens holder. Accordingly, the spherical lens can be held at a predetermined position in the lens holder by pushing the spherical lens into the receiving hole with a suitable force. Such holding structure of the spherical lens by force fitting assures firm holding of the spherical lens making good use of plastic deformation and/or elastic deformation of the lens holder. However, the holding structure has the following drawbacks.

In particular, where the material of the lens holder is a soft metal material such as invar, covar or brass, the lens holder undergoes plastic deformation by force fitting of the spherical lens. The lens holder swells at the force fit portion thereof so that the outer profile of the lens holder is nonuniform. Accordingly, it is a problem that, when the lens holder is closely contacted with and fixed to a flat substrate, then the center axis of the lens holder will not provide a parallel relationship to the flat surface of the substrate. On the other hand, where a hard metal material such as stainless steel is used as a material of the lens holder in order to omit corrosion preventing processing which is required for such a soft metal material as described above or in order to permit fixation of the lens holder to the substrate by welding, there is another problem, in addition to the problem described above, that the spherical lens is likely to be broken. In order to eliminate this, the accuracy in dimension of the diameter of the spherical lens and the diameter of the receiving hole of the lens holder must necessarily be raised specially, which makes a problem that the production cost is raised considerably.

An optical part wherein a spherical lens is force fitted into a cylindrical lens holder from an end of the lens holder and a ferrule to which an optical fiber is connected is fitted in and fixed to the other end of the lens holder is often used as an optical part which employs a spherical lens. Such optical part will be hereinafter referred to as a fiber collimator. Such a fiber collimator is frequently used, for example, in an optical switch for changing over a light path. Optical switches are widely used as a basic optical device, and optical devices are demanded which are high in reliability and suitable in miniaturization.

Conventionally, various types of optical switches for changing over an optical path have been proposed including a type wherein a movable prism is selectively inserted into a light path and another type wherein the coupling coefficient of a directional coupling device is changed depending upon an electro-optical effect. Among optical switches of the types mentioned, a conventional mechanical optical switch wherein a movable prism is selectively inserted into a light path has a drawback that the entire switch mechanism inevitably has a large overall size and another drawback that the problem of incomplete switching cannot be avoided which may be caused by particles produced by abrasion of a sliding portion of the switch or by dust or the like admitted into the switch. Particularly the problem of incomplete switching caused by dust is significant where the switching interval is very long.

SUMMARY OF THE INVENTION

Accordingly, it is an object of the present invention to provide an optical device employing a fiber collimator which overcomes such drawbacks of the prior art described above and wherein, when a lens holder is to be closely contacted with and fixed to a flat substrate, the optical axis thereof can be readily made parallel to the surface of the substrate.

It is another object of the present invention to provide an optical switch which is simple in construction, high in reliability and suitable for miniaturization.

According to one aspect of the present invention, there is provided an optical device wherein at least two fiber collimators each including a spherical lens, a cylindrical lens holder having a smaller inner diameter than the diameter of the spherical lens and having the spherical lens fixed therein by force fitting, and a ferrule inserted in and fixed to the lens holder and having an optical fiber connected thereto, are fixed on a substrate in a predetermined spaced relationship from each other. An optical function means is interposed between the fiber collimators. Each fiber collimator is characterized in that the thickness of a cylindrical wall of the cylindrical lens holder is made smaller along a force fitting route of the spherical lens and a peripheral portion around the force fitting route than at the other portion, and that the cylindrical lens holder is fixed to the substrate by welding.

With the optical device, since deformation of the lens holder upon force fitting does not have an influence on the fixed portion of the lens holder to the substrate, accurate positioning of the lens holder is realized. Further, even where the lens holder is formed from a hard material, possible damage upon force fitting of the spherical lens can be prevented without raising the accuracy in dimension of the spherical lens and a receiving hole for the spherical lens.

The optical function means provided between the fiber collimators may include an optical switch, an optical attenuator, a light combining and/or separating device or the like.

According to another aspect of the present invention, there is provided an optical switch which employs a plurality of fiber collimators and an optical function means which is a means for changing over a path of light by inserting a movable prism selectively into the path of light.

The light path changing over means may include a casing, an iron core, a coil wound around the iron core and accommodated in the casing, a fixed member provided on the outside of the coil, a substantially L-shaped movable member having a bent portion for contacting with an end portion of the fixed member, a prism provided on the movable member for changing over the path of light, and urging means for urging the movable member toward the fixed member. Further, the first fiber collimator and the second fiber collimator may be provided in an opposing relationship on the opposite sides of the light path changing over means such that optical axes thereof may coincide with each other, and the third fiber collimator may be provided on the substrate on the side of the second fiber collimator such that light which is emitted from the first fiber collimator and the path of which is displaced in a parallel relationship to the incident light by the prism may be introduced into the third fiber collimator.

With the optical switch having such a construction as described above, when the coil is not excited, the prism is inserted in the path of light so that light from the first fiber collimator is introduced into the third fiber collimator. When the coil is excited, the movable member is pivoted to displace the prism out of the path of light so that light from the first fiber collimator may be introduced into the second fiber collimator.

According to a further aspect of the present invention, there is provided an encapsulating structure for an optical device wherein the optical device which employs the fiber collimators is enclosed in a housing made of a metal material. The encapsulating structure for an optical device is constituted such that a jacket of an optical fiber is partly removed at an end portion thereof and a metal coating is formed continuously from a surface of the optical fiber from which the jacket is removed to a surface of an intermediate portion of the jacketed fiber. The optical fiber on which the metal coating is formed extends through a hole formed in an enclosing housing made of a metal material and the metal coating is soldered to the metal housing at the hole.

BRIEF DESCRIPTION OF THE DRAWINGS

FIGS. 4A and 4B are schematic views illustrating operation of the light path changing over mechanism of FIG. 3, and wherein FIG. 4A shows the mechanism when a coil is not excited and FIG. 4B shows the mechanism when the coil is excited;

DESCRIPTION OF THE PREFERRED EMBODIMENTS

Figure 1:
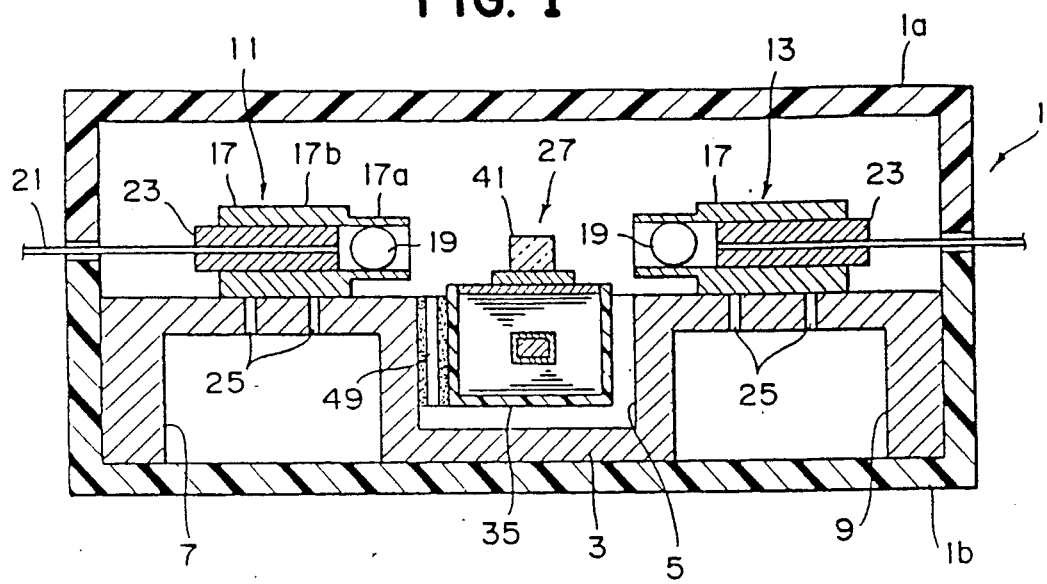
FIG. 1 is a sectional view of an embodiment wherein the present invention is applied to an optical switch.

In the following, a present invention will be described in detail in connection with the embodiments thereof shown in the drawings.

Figure 2:
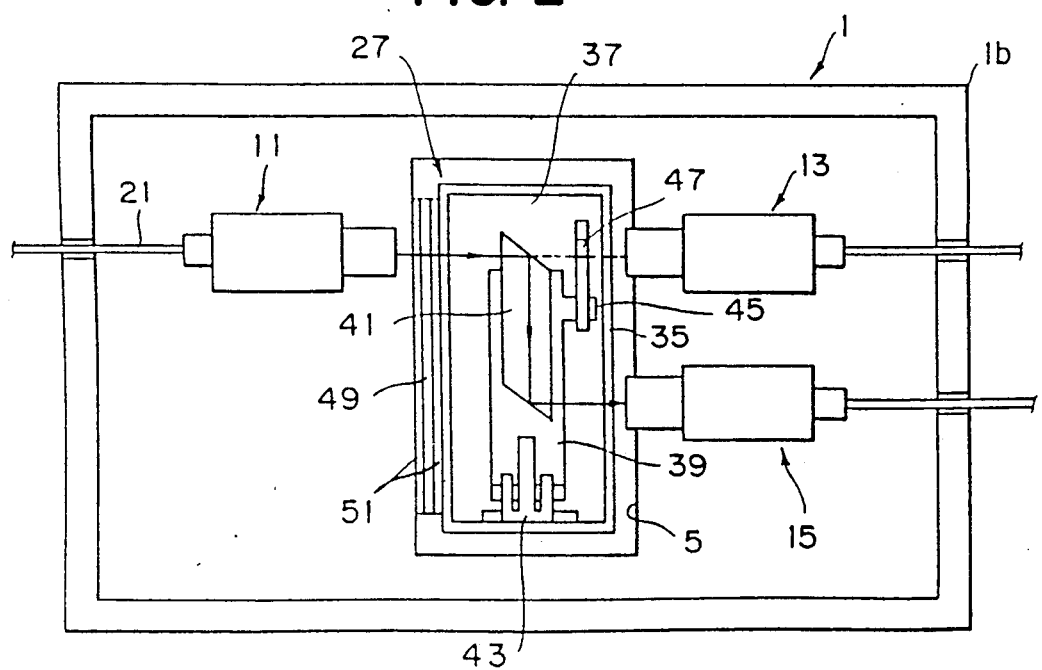
FIG. 2 is a plan view of the optical switch of FIG. 1.

FIGS. 1 and 2 show a sectional view and a plan view of an embodiment wherein the present invention is applied to an optical switch. The optical switch shown includes a housing 1 formed by molding of a plastic material and composed of an upper housing 1a and a lower housing 1b. A substrate 3 formed, for example, from stainless steel is accommodated in the housing 1. The substrate 3 has a first recess 5 formed at a central portion of a front surface side thereof while a second recess 7 and a third recess 9 are formed on a reverse surface side of the substrate 3. An input side fiber collimator 11 and a pair of output side fiber collimators 13 and 15 are provided on the substrate 3 as shown in FIG. 2. The fiber collimator 11 and the fiber collimator 13 are disposed in an opposing relationship such that optical axes thereof may coincide or be aligned with each other. Since the fiber collimators 11, 13 and 15 have the same construction, only the construction of the fiber collimator 11 will be described as a representative in the following.

The fiber collimator 11 includes a generally cylindrical lens holder 17 having a small diameter portion 17a and a large diameter portion 17b, a spherical lens 19 force fitted in the lens holder 17 from the small diameter 17a side, and a ferrule 23 fixedly inserted in the lens holder 17 from the large diameter side 17b and having an optical fiber 21 fixedly inserted therein. The lens holder 17 and the ferrule 23 are formed, for example, from stainless steel. In force fitting the spherical lens 19 for fixation, since the small diameter portion 17a is formed on the lens holder 17, the small diameter portion 17a is deformed comparatively readily. Consequently the spherical lens 19 is prevented from being broken by a reactive force to such force fitting. Further, even if the small diameter portion 17a of the lens holder 17 is deformed, such deformation will not have an influence on the large diameter portion 17b of the lens holder 17. Accordingly, when the fiber collimator 11 is fixed to the substrate 3, the optical axis of the fiber collimator 11 can be maintained in parallel to the flat surface of the substrate 3 with certainty.

The fiber collimators 11, 13 and 15 are fixed to the surface of the substrate 3 in the following manner. In particular, the fiber collimators 11, 13 and 15 are positioned on the substrate 3 using a positioning jig having three V-shaped grooves formed thereon for positioning the fiber collimators 11, 13 and 15, and then the lens holders 17 of the fiber collimators 11, 13 and 15 are fixed to the substrate 3 by laser welding through small holes 25 formed in bottom walls of the second and third recesses 7 and 9 of the substrate 3. Since the small diameter portions 17a are formed on the lens holders 17 as described above, the fiber collimators 11, 13 and 15 can be fixed by welding such that the optical axes thereof may maintain a parallel relationship to the flat surface of the substrate 3 with certainty.

In each of the fiber collimators 11, 13 and 15 described above, in order to reduce the thickness of a portion of the lens holder 17 which corresponds to a route along which a spherical lens 19 is to be force fitted and a peripheral portion around the route, the lens holder is machined from the outer side to the inner side of the lens holder 17 to form the small diameter portion 17a. Such a manner of formation is employed from the following two reasons. In particular, firstly a machining operation from the outer side to the inner side of the lens holder 17 made of a metal material is generally easy. Secondly, if the thickness of the portion of the lens holder into which the spherical lens 19 is force fitted is small, deformation of the lens holder upon force fitting of the spherical lens will reach an outer peripheral portion of the lens holder, and hence, if the small diameter portion 17a is not formed on the lens holder 17, then when the lens holder 17 is closely contacted with and fixed to the substrate 3 having a flat surface, the optical axis thereof cannot be put into a parallel condition to the flat surface of the substrate 3.

Figure 3:
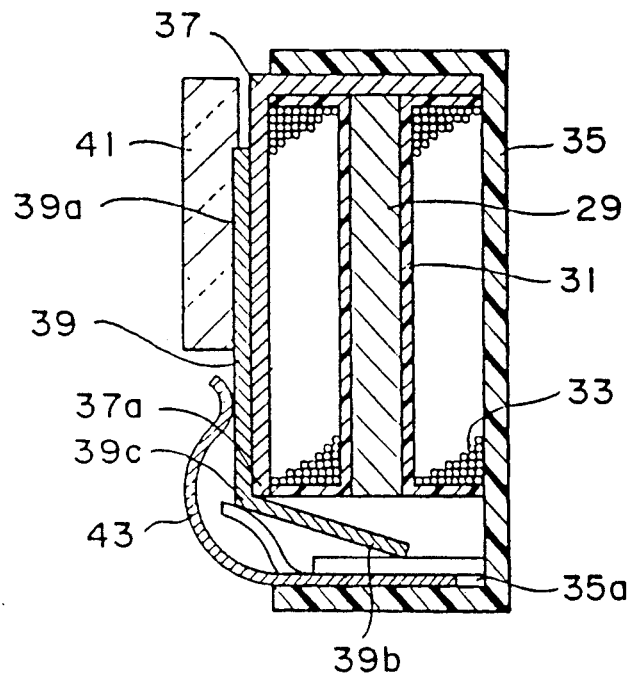
FIG. 3 is a vertical sectional view of a light path changing over mechanism.

A light path changing over mechanism 27 is interposed between the input side fiber collimator 11 and the output side fiber collimators 13 and 15 for changing over a path of light emitted from the input side fiber collimator 11. The light path changing over mechanism 27 is constructed in the following manner. As best shown in FIG. 3, a coil 33 wound around a bobbin 31 is fitted on and attached to an iron core 29 to form a unit, and the unit is accommodated in a casing 35 made of a plastic material. A fixed plate member 37 formed, for example, from a soft magnetic material is disposed on the outside of the coil 33. A diamond-shaped prism 41 is mounted on a surface of a longer leg portion 39a of a movable plate member 39 of a substantially L-shaped configuration formed, for example, from a soft magnetic material. A shorter leg portion 39b of the movable plate member 39 extends to a position corresponding to the iron core 29, and an end portion 37a of the fixed plate member 37. The fixed plate member 37 is held in abutting engagement with an obtusely bent portion 39c of the movable plate member 39. The movable plate member 39 is normally urged to pivot around the abutting end portion 37a of the fixed plate member 37 toward the fixed plate member 37 by a leaf spring 43 force fitted in a leaf spring receiving portion 35a of the casing 35. As shown in FIG. 2, the movable plate member 39 has a projection 45 formed thereon while the fixed plate member 37 has a stopper 47 formed thereon for engaging with the projection 45.

The light path changing over mechanism 27 having such a construction as described above is adhered to a wall face of the first recess 5 of the substrate 3 in the following manner. In particular, the light path changing over mechanism 27 is fixed to the substrate 3 by means of a pair of ultraviolet light curable resin layers 51 with a transparent plate member 49 disposed between the casing 35 of the light path changing over mechanism 27 and the wall face of the first recess 5 of the substrate 3. When ultraviolet light is irradiated toward the inside of the transparent plate member 49, it is reflected from a pair of interfaces between the transparent plate member 49 and the ultraviolet light curable resin layers 51 or the other interfaces between the ultraviolet light curable resin layers 51 and the wall face of the substrate 3 as well as the case 35 and thus spreads over the entire transparent plate member 49. Consequently, the ultraviolet light curable resin is caused to cure rapidly by the irradiation of the ultraviolet light. Since adhesion by the ultraviolet light curable resin can be carried out at a low temperature, such possible problems that an optical part may be deformed by fixation using an adhesive or that a stress may act upon an optical part can be avoided.

Subsequently, operation of the optical switch described above will be described.

Figure 4A:
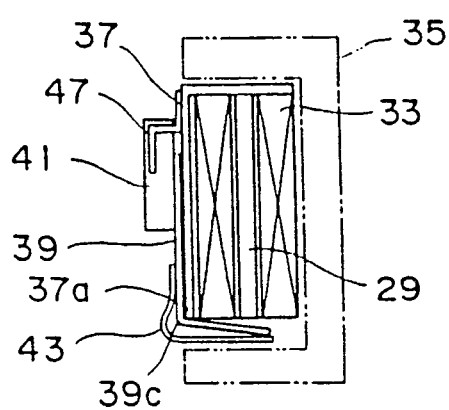
Figure 4B:
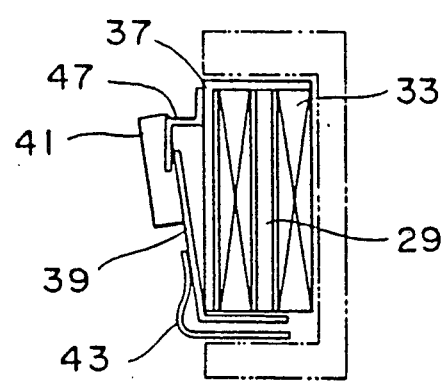

FIG. 4A shows the optical switch in a condition wherein the coil 33 is not excited. In this condition, the movable plate member 39 is pressed against the fixed plate member 37 by the leaf spring 43 to insert the diamond-shaped prism 41 in a path of light. Thus, light emitted from the incident side fiber collimator 11 is totally reflected twice by the diamond-shaped prism 41 inserted in the light path to bend the path thereof so that it is introduced into the output side fiber collimator 15. To the contrary, if the coil 33 is energized to excite the iron core 29, the shorter leg portion 39b of the movable plate member 39 is attracted to the iron core 29. The attraction causes the movable plate member 39 to pivot in the counterclockwise direction in FIG. 3 around the abutting end portion 37a of the fixed plate member 37 against the urging force of the leaf spring 43. The diamond-shaped prism 41 resultantly moves out of the light path as shown in FIG. 4B. Consequently, light emitted from the input side fiber collimator 11 advances straightforwards and thus enters the output side fiber collimator 13. In this manner, in the optical switch of the present embodiment, the path of light emitted from the input side fiber collimator 11 can be changed over between the output side fiber collimators 13 and 15. Since the movable plate member 39 is pivoted, upon energization of the coil 33, in the counterclockwise direction until the projection 45 of the movable plate member 39 is contacted with the stopper 47, a stabilized change-over characteristic can be obtained.

The optical switch of the embodiment described above has a reduced susceptibility to influence of dust or the like from the outside because the L-shaped movable plate member 39 is pivoted in a line contacting relationship around the abutting end portion 37a of the fixed plate member 37 disposed on the outside of the coil 33 comparing with an optical switch of a conventional type wherein a prism for changing over a light path is moved under the guidance of a slider and a slider guide. Further, since the movable plate member is pivoted in a line contacting relationship with the fixed plate member, abrasion at such pivoting portions can be almost ignored. Further, since the coil 33, iron core 29 and movable plate member 39 are arranged in a good arrangement from the point of view of a magnetic efficiency as shown in FIGS. 3, 4A and 4B, miniaturization of the optical switch is possible.

While the embodiment described above concerns with an optical switch, the present invention is not limited to such optical switch, and some other optical function part or optical function mechanism such as, for example, an optical attenuator, a light combining-/separating device or an optical coupler may be interposed between the input side fiber collimator 11 and the output side fiber collimators 13 and 15.

Figure 5:
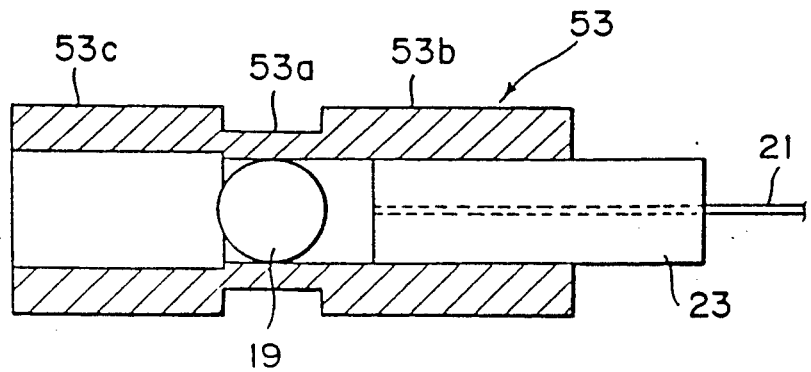
FIG. 5 is a sectional view showing another embodiment of a fiber collimator.

FIG. 5 shows a sectional view of another embodiment of the fiber collimator of the present invention. In the present embodiment, a small diameter portion 53a of a lens holder 53 to which a spherical lens 19 is fixed by force fitting is formed at a substantially central portion of the lens holder 53 in a longitudinal direction (in the direction of an optical axis). A pair of large diameter portions 53b and 53c are formed on the opposite sides of the small diameter portion 53a. The inner diameter of the large diameter portion 53b of the lens holder 53 into which a ferrule 23 is inserted and fixed is the same as the inner diameter of the small diameter portion 53a while the inner diameter of the large diameter portion 53c is set greater than the inner diameter of the smaller diameter portion 53a. The reason why the inner diameter of the large diameter portion 53c is made greater is that it is intended to eliminate frictional resistance at the large diameter portion 53c when the spherical lens 19 is force fitted into the small diameter portion 53a. According to the structure of the present embodiment, the spherical lens 19 can be supported on the opposite sides thereof on a substrate, and accordingly the strength in fixation is increased. Further, since the inside of the large diameter portion 53c is hollow, it is possible to carry, at the hollow location an optical element not shown such as a glass block with a filter film.

Figure 6:
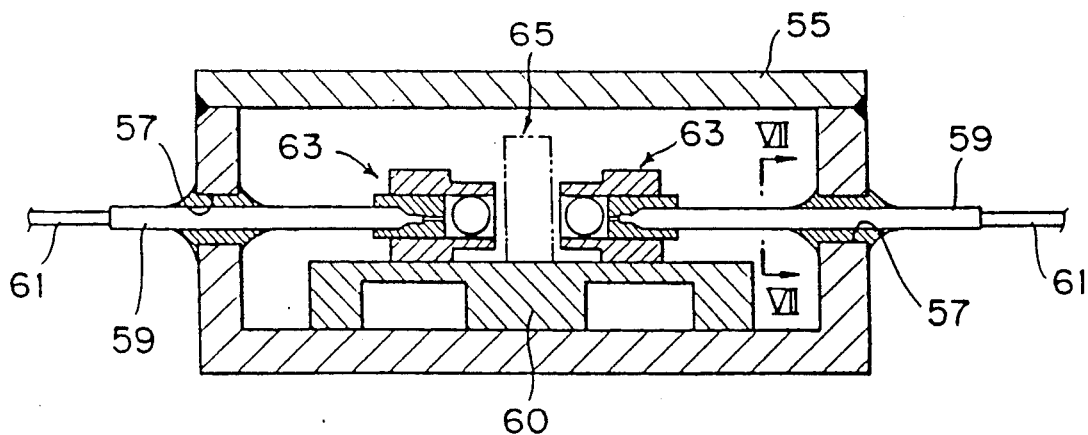
FIG. 6 is a sectional view of an embodiment showing an encapsulating structure for an optical device according to the present invention.

Referring now to FIG. 6, there is shown a sectional view of an optical device of the present invention which is enclosed in an encapsulating structure. In recent years, as the range of applications of optical communication systems or optical transmission systems which employ an optical fiber as a transmission path is expanded, optical devices are put into use in various environmental conditions. Accordingly, an encapsulating structure for an optical device wherein no bad influence is had on the performance thereof in a high temperature and/or high humidity condition or in a low temperature condition is demanded. The embodiment of FIG. 6 provides a perfect encapsulating structure for an optical device of the present invention.

Referring to FIG. 6, a pair of holes 57 are perforated in the opposite end walls of an encapsulating structure 55 made of a solderable metal material. An optical fiber 61 having a metal film 59 formed thereon extends through each of the holes 57. The inside of the metal encapsulating structure 55 is enclosed by fixing the metal films 59 to the metal encapsulating structure 55 at the holes 57 by soldering. Upon soldering, it is preferable to use solder of a low melting point such as 110° to 120° C. or so in order to prevent deterioration of a coating (jacket) of an optical fiber. A terminal end of each of the optical fibers 61 in the inside of the metal encapsulating structure 55 is connected to a fiber collimator 63 which has substantially the same construction as the fiber collimator 11 described hereinabove. Also contained within the encapsulating structure 55, an optical function element 65 such as a light path changing over mechanism is interposed between the opposing ends of the fiber collimators 63 so as to exhibit a desired function. The fiber collimators 63 and the optical function element 65 are fixed to a substrate 60 made of a metal material. It is to be noted that the inside of the metal encapsulating structure 55 may be filled with inert gas such as N₂ to prevent a possible inter-molecular leak or the like.

Figure 7:
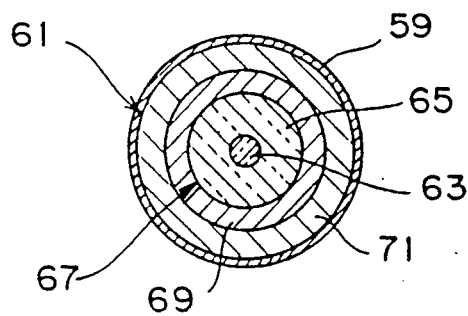
FIG. 7 is a sectional view taken along line VII—VII of FIG. 6.

Referring now to FIG. 7, there is shown a sectional view taken along line VII—VII of FIG. 6. Each of the optical fibers 61 is composed of a bare optical fiber composed of a core 63 and a clad 65. An inner jacket 69 made of a silicone resin or the like is formed on the bare optical fiber 67, and an outer jacket 71 made of nylon or the like formed on the inner jacket 69. The coating 59 of a metal such as, for example, nickel is formed on the surface of the optical fiber 61 by such means as electroless plating or metallizing processing. According to such optical fiber structure, since the inner jacket 69 and the outer jacket 71 act as buffer layers, even if a tensile force acts upon the optical fiber in FIG. 6, the possibility of damage to the optical fiber is low compared to an optical fiber of a conventional structure.

Figure 8:
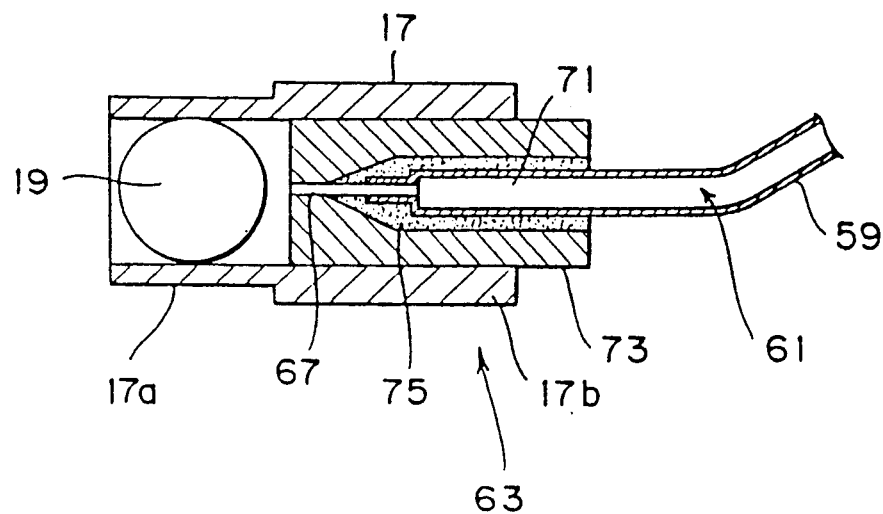
FIG. 8 is a detailed sectional view of a fiber collimator of FIG. 6.

FIG. 8 is a sectional view of the fiber collimator 63 shown in FIG. 6. The fiber collimator 63 is constituted such that the bare optical fiber 67 is inserted in and fixed to a ferrule 73. The ferrule 73 which is inserted in and fixed to a cylindrical lens holder 17 to which a spherical lens 19 is fixed by force fitting. The lens holder 17 has a small diameter portion 17a and a large diameter portion 17b. The spherical lens 19 is force fitted in and fixed to a receiving hole of the small diameter portion 17a of the lens holder 17. The metal coating 59 provided on the surface of the outer jacket 71 of the optical fiber 61 extends to a portion of the bare optical fiber 67 which is an exposed portion of the optical fiber. Consequently, possible transmission of air from and to the outside by way of a gap between the bare optical fiber 67 and the inner jacket 69 or another gap between the inner jacket 69 and the outer jacket 71 is prevented, thereby attaining a good enclosed condition. A bonding agent 75 is filled in the inside of the ferrule 73.

With the encapsulating structure of the present embodiment described above, since the optical fiber 61 is fixed by soldering to the encapsulating structure 55 by way of the metal coating 59 formed on the outer jacket 71, the optical fiber can be bent by a greater amount than is possible with a conventional encapsulating structure. As a result, handling of the device during manufacture is facilitated so that an optical device of a reduced size can be provided.

Figure 9:
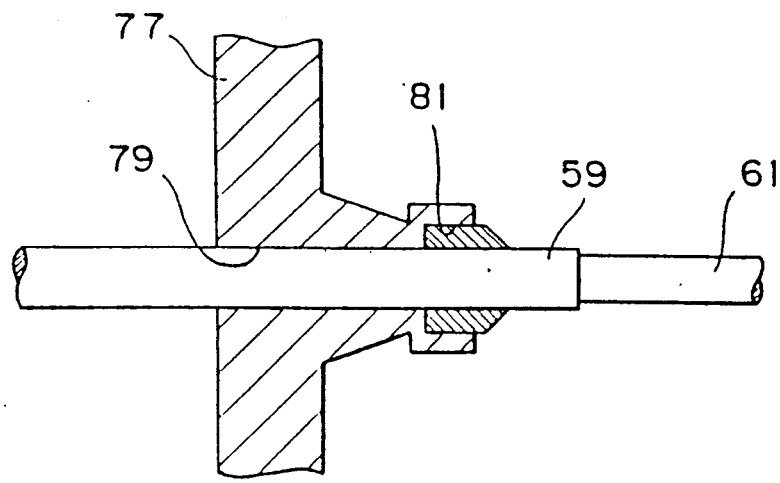
FIG. 9 is a sectional view showing another embodiment of a soldered portion.

It is to be noted that, as shown in FIG. 9, for soldering of the metal coating 59, a solder receiver 81 may be formed at an outer end portion of a hole 79 which is formed in the encapsulating structure. The hole 79 has an inner diameter substantially coincident to the outer profile of the metal coating 59 of the optical fiber 61. According to the structure, the amount of solder to be used for soldering can be reduced compared to that of the preceding embodiment, and soldering can be carried out readily.

Since the thickness of a portion of a lens holder in which a spherical lens is to be force fitted is made smaller than that of the other portion of the lens holder, deformation of the lens holder caused by force fitting does not have an influence on another portion of the lens holder at which the lens holder is fixed to a substrate. Consequently, accurate positioning of the lens holder can be attained readily. According to a preferred embodiment, an optical switch can be provided which is reduced in influence of abrasion of a movable portion and dust or the like from the outside and is suitable for miniaturization and high in reliability. According to an optical device which employs an enclosing structure of the present invention, handling of an optical fiber in the inside of a housing is facilitated and the performance of the optical device can be exhibited sufficiently in a severe environmental condition such as a high temperature and/or high humidity condition or a low temperature condition.

We claim:

1. An optical device for providing an optical function for a plurality of optical fibers, comprising:
   a substrate;
   at least two fiber collimators each including:
   a spherical lens (19), a cylindrical lens holder including a cylindrical wall, a peripheral portion, a force fitting route, and a remaining portion, said cylindrical lens holder having a smaller inner diameter than the diameter of said spherical lens and having said spherical lens fixed therein by force fitting, a ferrule inserted in and fixed to said cylindrical lens holder and having one of the plurality of optical fibers connected thereto, said at least two fiber collimators being fixed by welding on said substrate in a predetermined spaced relationship from each other; and optical function means interposed between said fiber collimators for providing the optical function, wherein the thickness of the cylindrical wall of said cylindrical lens holder is made smaller along the force fitting route of said spherical lens and the peripheral portion around the force fitting route than at the remaining portion of said cylindrical lens holder.

2. An optical device as set forth in claim 1, wherein said optical function means includes means for changing over a path of light by inserting a movable prism selectively into the path of light.

3. An optical device as set forth in claim 2, wherein said light path changing over means includes:

a casing, an iron core, a coil capable of being excited or not excited, wound around said iron core and accommodated in said casing, a fixed member including an end portion, provided on the outside of said coil, a substantially L-shaped movable member having a bent portion for contacting with the end portion of said fixed member, and having the movable prism coupled with said movable member for changing over the path of light, and urging means for urging said movable member toward said fixed member, wherein the predetermined spaced relationship includes a first one of the at least two fiber collimators and a second one of the at least two fiber collimators provided in an opposing relationship on the opposite sides of said light path changing over means such that optical axes thereof may coincide with each other, wherein a third one of the at least two fiber collimators is provided on said substrate beside said second one of the at least two fiber collimators such that light which is emitted from said first one of the at least two fiber collimators and the path of which is displaced in a parallel relationship to the incident light by said movable prism may be introduced into said third one of the at least two fiber collimators, and wherein when said coil is not excited, said movable prism is inserted in the path of light, so that light from said first one of the at least two fiber collimators is introduced into said third one of the at least two fiber collimators, but when said coil is excited, said movable member is pivoted to displace said movable prism out of the path of light so that light from said first one of the at least two fiber collimators may be introduced into said second one of the at least two fiber collimators.

4. An optical device as set forth in claim 3, wherein said substrate includes a recess having a side wall face, further comprising:

an ultraviolet light curable resin for adhering the casing to the side wall face of the recess; and a transparent member which is transparent at least with respect to ultraviolet light.

5. An optical device as set forth in claim 1, wherein one of the plurality of optical fibers includes a jacketing, an intermediate portion, and an end portion, the jacketing being partly removed at the end portion thereof, further comprising:

a metal coating formed continuously on said optical fiber from the end portion from which the jacketing is removed to the intermediate portion of said one of the plurality of optical fibers; and an encapsulating structure made of a metal material having a hole therein, wherein said one of the plurality of optical fibers on which said metal coating is formed is inserted into the hole, and wherein said metal coating is soldered to said encapsulating structure at said hole.

6. An optical device as set forth in claim 5, further comprising:

a bonding agent for fixing the end portion of said optical fiber on which said metal coating is formed to said ferrule.

7. A method of manufacturing a fiber collimator for an optical fiber, said fiber collimator including a cylindrical lens holder and a spherical lens, said method comprising the steps of:

a) manufacturing a thickness of a cylindrical wall of the cylindrical lens holder so that the thickness of the cylindrical wall is smaller along a force-fitting route than at a remaining portion of the cylindrical lens holder;

b) force-fitting the spherical lens into the cylindrical lens holder along the force-fitting route; and c) coupling the optical fiber to the fiber collimator.

8. A method of manufacturing a fiber collimator for an optical fiber, said fiber collimator including a cylindrical lens holder and a spherical lens, said method comprising the steps of:

a) manufacturing an outer diameter of the cylindrical lens holder so that the outer diameter of the cylindrical lens holder is smaller along a force-fitting route of the cylindrical lens holder than at a remaining portion of the cylindrical lens holder;

b) force-fitting the spherical lens into the cylindrical lens holder along the force-fitting route; and c) coupling the optical fiber to the fiber collimator.

9. A method of manufacturing a fiber collimator for an optical fiber, said fiber collimator including a cylindrical lens holder and a spherical lens, said method comprising the steps of:

a) manufacturing an outer diameter of the cylindrical lens holder at a location surrounding a final position of the spherical lens so that the outer diameter of the cylindrical lens holder is less than the outer diameter of the cylindrical lens holder at a remaining portion;

b) force-fitting the spherical lens along the force-fitting route to the fixed position of the spherical lens in the cylindrical lens holder; and c) coupling the optical fiber to the fiber collimator.

* * * * *

UNITED STATES PATENT AND TRADEMARK OFFICE
CERTIFICATE OF CORRECTION

PATENT NO. : 5,048,912
DATED : September 17, 1991
INVENTOR(S) : Kunikane et al.

It is certified that error appears in the above-identified patent and that said Letters Patent is hereby corrected as shown below:

Title page, under title, after "SWITCHING" insert --DEVICE--;

Title page, under Inventor, delete "I";

Title page, under U.S. Patent Documents, change "Wallenweber" to --Wollenweber et al.--;

Col. 1, line 1, after "SWITCHING" insert --DEVICE--;

Col. 7, line 40, "films" should be --film--.

Signed and Sealed this

Ninth Day of February, 1993

*Attest:*

STEPHEN G. KUNIN

*Attesting Officer*  Acting Commissioner of Patents and Trademarks